Figure 1:
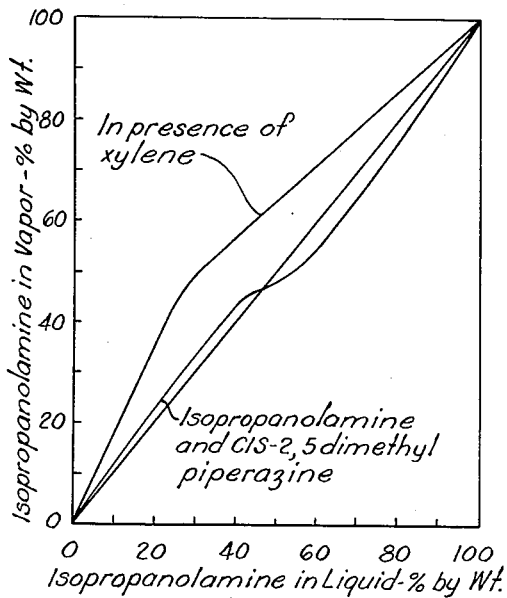

May 8, 1962

E. C. BRITTON ETAL 3,033,864

PURIFICATION OF PYRAZINE

Filed Oct. 13, 1954

INVENTORS
Edgar C. Britton
Lee H. Horsley
David B. Kellom
BY Griswold & Burdick
ATTORNEYS United States Patent Office 3,033,864
Patented May 8, 1962

3,033,864
PURIFICATION OF PYRAZINE
Edgar C. Britton, Lee H. Horsley, and David B. Kellom, Midland, Mich., assignors to The Dow Chemical Company, Midland, Mich., a corporation of Delaware
Filed Oct. 13, 1954, Ser. No. 462,012
4 Claims. (Cl. 260—250)

This invention relates to the purification of pyrazines and piperazines. More particularly, it pertains to a method for the separation of alkanolamines, from mixtures thereof with at least one heterocyclic nitrogen compound selected from the class consisting of pyrazines and piperazines, by azeotropic distillation.

Pyrazines and piperazines can be prepared from alkanolamines, e.g. by heating, usually in the presence of a hydrogenation catalyst. Bain and Pollard, in J. Am. Chem. Soc. 61, 532 (1939), report having formed several piperazine derivatives, such as 2,5-dimethyl piperazine, by heating solutions of the corresponding alkanolamines, such as isopropanolamine, in dioxane together with copper chromite as a catalyst and in contact with hydrogen at superatmospheric pressure, to temperatures in the order of from 250° to 275° C. Pyrazines can be formed by dehydrogenation of the corresponding piperazines.

It is often difficult to separate the desired reaction product from the unreacted alkanolamine by ordinary methods such as distillation. Even when the desired product can be partially separated from the alkanolamine, it is sometimes necessary or desirable to effect a higher degree of purification of the pyrazine or piperazine than is ordinarily obtainable by the usual methods.

It is an object of this invention to provide a method for the purification of pyrazines and piperazines obtained from alkanolamines.

A further object is to provide such a method for the separation of mixtures comprising pyrazines and/or piperazines and alkanolamines.

Another object is to provide such a method whereby pyrazines and piperazines can be substantially freed of alkanolamines.

Another object is to provide such a method whereby alkanolamines can be recovered from mixtures with pyrazines and/or piperazines in a form satisfactory for further use.

Other objects and advantages will be evident from the following description.

The objects of this invention are attained in a method wherein mixtures of pyrazines and/or piperazines and alkanolamines are fractionally distilled together with a codistillation agent whereby lower-boiling azeotropes of the codistillation agent and the alkanolamines are separated as distillates from residues which are enriched in respect to the pyrazines and/or piperazines.

The invention can be practiced with any codistillation agent which is non-reactive chemically with the components of the starting material under distillation conditions, and which forms with the alkanolamine in the starting material a distillate whose boiling point is below the boiling points of other components of the distillation mixture.

It is desirable that the azeotropic distillate contain appreciable proportions of both the alkanolamine and the codistillation agent. To this end, there are usually employed codistillation agents having normal boiling points, i.e., boiling points at one atmosphere pressure, between about 130° and 200° C., preferably between 130° and 165° C. Usually the preferred codistillation agents have normal boiling points below that of the alkanolamine to be separated since these are generally more efficient than are the higher boiling agents.

Suitable codistillation agents which can be employed in the practice of this invention are aliphatic hydrocarbons, aromatic hydrocarbons and nuclear chlorinated aromatic hydrocarbons having normal boiling points between about 130° and 200° C. Representative examples of such suitable codistillation agents are aliphatic hydrocarbons, particularly octane and higher hydrocarbons, including mixtures such as petroleum fractions, cycloaliphatic hydrocarbons such as ethyl cyclohexane, aromatic hydrocarbons such as ethylbenzene, the xylenes, diethylbenzene, ethyltoluene and cumene, and nuclear chlorinated aromatic hydrocarbons such as chlorobenzene.

Representative examples of mixtures from which the alkanolamine can be separated by the present method are mixtures containing piperazine and ethanolamine; pyrazine and ethanolamine; cis-2,5-dimethylpiperazine and isopropanolamine; trans-2,5-dimethylpiperazine and isopropanolamine; 2,5-dimethylpyrazine and isopropanolamine; and diethylpiperazine and butanolamine.

In practice of the invention, a mixture containing a piperazine, or a pyrazine, or both, and an alkanolamine, together with one of the aforementioned codistillation agents, is fractionally distilled. The distillation can be carried out in batch or in continuous manner and at above or below atmospheric pressure. When batch operations are employed, the codistillation agent can be charged with the mixture to be separated and in proportions necessary to form a codistillate with all of the alkanolamine. Alternatively, a smaller proportion of codistillation agent can be charged initially and additional amounts of such agent can be added gradually, e.g., in small portions, to the still during the distillation. Another procedure is to separate the codistillation agent from the codistillate and to return the separated codistillation agent as reflux to the distillation zone. By the latter procedure, a relatively small proportion of codistillation agent can be continuously recycled to effect the separation of a relatively large proportion of starting mixture of alkanolamine and heterocyclic nitrogen compound. In continuous operation, a starting mixture of alkanolamine and heterocyclic nitrogen compound can be fed continuously together with a codistillation agent, either admixed or separately, to a continuous fractional distillation zone. If an inventory of codistillation agent is constantly maintained in the distillation zone by continuously separating the codistillation agent from the codistillate and continuously returning the separated agent as reflux to the distillation zone, then the feed may consist of the alkanolamine and isopropanolamine starting mixture and only make-up amounts of codistillation agent need be supplied to the still. In such instance, a relatively small proportion of the agent suffices to effect the separation of a relatively large proportion of starting mixture of alkanolamine and heterocyclic nitrogen compound.

By means of one of these codistillation procedures, there are obtained a distillate, comprising the alkanolamine and the codistillation agent, and a residue, comprising the heterocycle nitrogen compound, i.e., the piperazine and/or the pyrazine. By employing efficient fractional distillation, the distillate can be substantially free of the heterocyclic nitrogen compounds and the residue can be substantially free of the alkanolamine.

The alkanolamine can be recovered from admixture with the codistillation agent in the distillate in usual ways. In some instances the alkanolamine is immiscible with the codistillation agent and the liquid layers can be mechanically separated. For example, isopropanolamine codistills with ethylcyclohexane and two layers form in the condensed codistillate, one layer being essentially isopropanolamine and the other being essentially ethylcyclohexane. In other instances, where the alkanolamine and the codistillation agent are miscible, but the codistillation agent is not miscible with water, a separation can be effected by adding a small proportion of water to the distillate. For example, a homogeneous distillate of isopropanolamine and xylene is caused to form two layers by the addition of a small proportion of water, one of the resulting layers consisting essentially of xylene and the other consisting essentially of isopropanolamine and water. After separation from the codistillate, the codistillation agent can be returned to the distillation zone to effect a further codistillation with alkanolamine.

Figure 2:
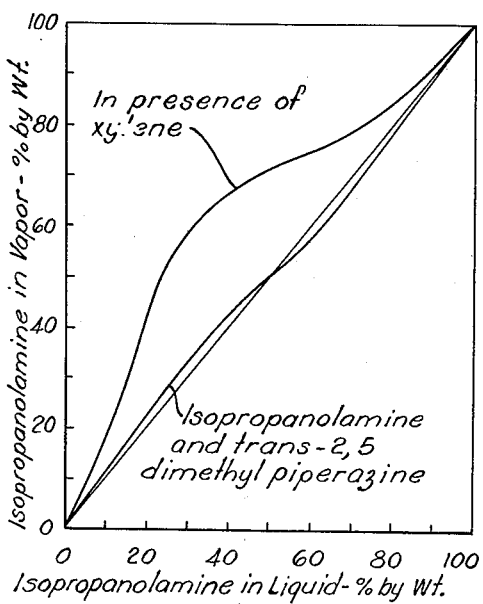

The present method is especially advantageous for the separation of isopropanolamine from admixture with 2,5-dimethylpiperazines. As shown by FIGURES 1 and 2 of the drawing, isopropanolamine normally forms an azeotrope with cis-2,5-dimethylpiperazine and with trans-2,5-dimethylpiperazine. FIGURES 1 and 2 show liquid-vapor equilibrium compositions by weight for the system isopropanolamine and the 2,5-dimethylpiperazines. The straight diagonal lines represent theoretically identical compositions in liquid and vapor phases. The S-shaped curves clinging close to the diagonals are drawn from experimental data and show the actual composition of the vapor in equilibrium with the liquid at the atmospheric boiling point of mixtures of isopropanolamine and cis-2,5-dimethyl piperazine (FIG. 1) and trans-2,5-dimethyl piperazine (FIG. 2), respectively. For low concentrations of isopropanolamine in the liquid, the curves show that the isopropanolamine is slightly more volatile than the piperazine compound. For high concentrations of isopropanolamine in the liquid, the curves show that the piperazine compound is slightly more volatile than the isopropanolamine. Where the curves cross the diagonal, i.e. at about 46 percent isopropanolamine in the cis-2,5-dimethylpiperazine mixture and at about 52 percent isopropanolamine in the trans-2,5-dimethylpiperazine mixture, an azeotropic composition is indicated. As is indicated by these curves, fractional distillation of mixtures of isopropanolamine and 2,5-dimethylpiperazines are not only inefficient, but the distillate is an azeotropic composition which cannot be separated by ordinary distillation.

FIGURES 1 and 2 also show the equilibrium compositions for the system isopropanolamine and the 2,5-dimethylpiperazines in the presence of an excess of xylene at the atmospheric boiling point of the mixtures. The compositions represented by the upper curves obtained in presence of xylene are computed on a solvent-free basis, i.e. the compositions of liquid and vapor phases in equilibrium at the normal boiling point in presence of xylene are computed on the basis of the relative proportions of isopropanolamine and the 2,5-dimethylpiperazines in the mixtures. As these curves indicate, in the presence of xylene, the isopropanolamine is more volatile than the 2,5-dimethylpiperazines throughout the composition range. Furthermore, the wide separation of the composition curves in presence of xylene from the straight line diagonals indicates that an efficient separation of isopropanolamine from either cis- or trans-2,5-dimethylpiperazine can be obtained by fractional distillation in the presence of xylene.

Figure 3:
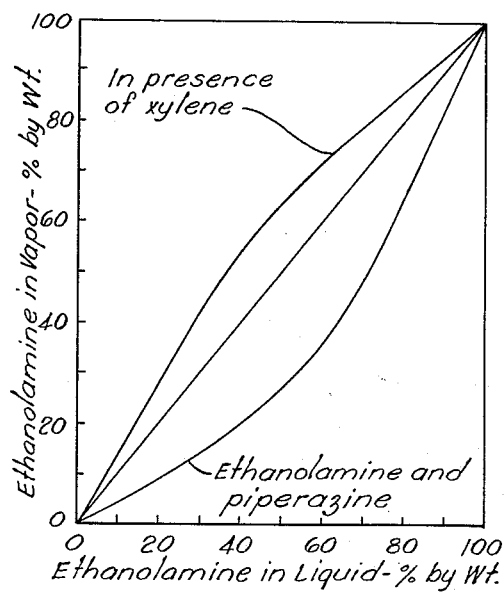

In some instances, a mixture of an alkanolamine and a piperazine or a pyrazine does not form an azeotrope. For example, the liquid-vapor equilibrium data for mixtures of ethanolamine and piperazine are shown in FIGURE 3 of the drawing. The lower curve shows that the mixture of ethanolamine and piperazine is non-azeotropic and that the piperazine is more volatile than the alkanolamine. In some instances it is desirable to effect a greater degree of separation of ethanolamine from piperazine than can be readily effected by ordinary fractional distillation. In such instances, the present method is advantageously employed. As shown by FIGURE 3, distillation of mixtures of ethanolamine and piperazine in the presence of xylene makes the ethanolamine more volatile than the piperazine. The method is especially advantageous for removing the last traces of ethanolamine from mixtures rich in piperazine.

In general, the greater the difference there is between the normal boiling point of a lower-boiling codistillation agent and the normal boiling point of a higher-boiling mixture of alkanolamine and heterocyclic nitrogen compound to be separated, the more efficient is that separation, i.e., the more completely and readily can the alkanolamine be separated from the piperazine or pyrazine compound by codistillation with that agent. However, the greater that difference in normal boiling points, the greater is the proportion of codistillation agent in the distillate and, conversely, the less the proportion of alkanolamine. Use of a lower-boiling codistillation agent requires that a larger proportion of codistillation agent be distilled, condensed and separated in order to effect the removal of a given amount of alkanolamine. For example, in the distillation of a mixture of isopropanolamine and 2,5-dimethylpiperazine in the presence of cumene, using a moderate degree of fractionation, a larger proportion of codistillation agent is present in the distillate than when a similar distillation is carried out with diethylbenzene as the codistillation agent. However, much less 2,5-dimethylpiperazine is found in the isopropanolamine recovered from the distillate using cumene than when using diethylbenzene as the codistillation agent and the same moderate degree of fractionation.

In general, the paraffin compounds are more selective than naphthene compounds which, in turn, are more selective than aromatic compounds as codistillation agents. In other words, the proportion of alkanolamine to piperazines or pyrazines in the vapor phase over a given mixture in the presence of a codistillation agent usually varies with the chemical composition of the codistillation agent in descending order through the series of paraffin compounds, naphthene compounds and aromatic compounds, other factors, such as relative boiling points and distilling pressure, being equal.

The invention can be particularly described by reference to the production of trans-2,5-dimethyl piperazine from isopropanolamine.

By a condensation of isopropanolamine with itself by heating under pressure in the presence of a catalyst, there was obtained a reaction product comprising trans-2,5-dimethylpiperazine, unreacted isopropanolamine and organic by-products. To this reaction product was added about an equal volume of xylene and the resulting mixture was fractionally distilled. The distillate consisted largely of a mixture of xylene and isopropanolamine, and the distillation was continued until the isopropanolamine was substantially removed from the residue. The residue, containing trans-2,5-dimethylpiperazine, excess xylene and organic by-products, was cooled, whereupon trans-2,5-dimethylpiperazine crystallized out of the mixture and was collected by filtration in the usual manner.

The following examples show ways in which the invention has been practiced, but should not be construed as limiting its scope.

EXAMPLE 1

This example illustrates a simple procedure for testing a codistillation agent as to its utility and efficiency in separating an alkanolamine from a mixture thereof with a piperazine or pyrazine compound.

To different portions, each weighing 60 grams, of a mixture of about 34 percent by weight isopropanolamine and 66 percent cis-2,5-dimethylpiperazine, was added an equal weight of one of the materials identified in Table I. Each of the resulting mixtures was separately brought to reflux at atmospheric pressure in a fractionating column ¾ inch in diameter and 12 inches long and packed with small glass helices. At reflux equilibrium, a small fraction of 10–15 mls. of distillate was taken and analyzed.

In Table I, for each test the codistillation agent is identified, the distillation temperature range during the taking of the small distillate fraction is shown, and the analysis of the small fraction in percent by weight is shown. Also, recorded for each test are the proportions of isopropanolamine and cis-2,5-dimethylpiperazine in the small distillate fraction on a solvent-free basis. There is also shown the composition of a fraction obtained by a similar test of the same mixture of isopropanolamine and cis-2,5-dimethylpiperazine without any codistillation agent.

As can be seen from the Table I, all of the codistillation agents tested gave distillates in which the isopropanolamine predominated over the dimethylpiperazine, whereas in the absence of codistillation agent the dimethylpiperazine predominated.

Because of the short and inefficient fractionating column which was used with these small test batches, the distillate was not entirely free of the dimethylpiperazine. The tests are adequate for evaluating and comparing various codistillation agents in a simple manner.

By a similar procedure, other codistillation agents can be shown to effect a separation of mixtures of alkanolamines and piperazines and/or pyrazines.

ing an alkanolamine from a piperazine compound by azeotropic distillation where the codistillation agent is miscible with the alkanolamine.

A mixture comprising trans-2,5-dimethylpiperazine and about 20 percent by weight isopropanolamine is fed continuously to a mid-point of an efficient fractionating column operating at atmospheric pressure. The column also contains ethylbenzene as a codistillation agent. The column is heated by a bottom reboiler. The vapors fractionated out at the top of the column consist of the codistillation agent and isopropanolamine and are substantially free of dimethylpiperazine. The top vapors are condensed, forming a homogeneous liquid condensate. This condensate is conducted to a short, continuous liquid-liquid extraction column to which a small proportion of water is also fed continuously. From the top of the extractor is withdrawn ethylbenzene, substantially free of isopropanolamine, and from the bottom of the extractor is withdrawn an aqueous isopropanolamine fraction substantially free of ethylbenzene. The water in the isopropanolamine fraction is removed by a separate fractional Table I

| Codistillation Agent | Distillation Temperature, °C. | Analysis of Distillate, Percent by Weight | | | Solvent-Free Distillate, Percent by Weight | |
|---|---|---|---|---|---|---|
| | | Codistillation Agent | Isopropanolamine | Cis-2,5-dimethyl-piperazine | Isopropanolamine | Cis-2,5-dimethyl-piperazine |
| None | 154–156 | | 40.4 | 59.6 | 40.4 | 59.6 |
| Ethylbenzene | 130–133 | 84.2 | 11.5 | 4.3 | 73 | 27 |
| Cumene | 140–143 | 71.9 | 18.5 | 9.6 | 66 | 34 |
| Ethylcyclohexane | 122–124 | heterogeneous; not analyzed | | | 75.2 | 24.8 |
| Chlorobenzene | 129–130 | 86.1 | 10.9 | 3.0 | 78.4 | 21.6 |
| Diethylbenzene | 152–154 | 37.1 | 38.7 | 24.2 | 61.5 | 38.5 |
| Petroleum Distillate; See Note 1. | 120–121 | Ca 85%; See Note 2. | | | 85 | 15 |

NOTE 1.—The petroleum distillate was a paraffinic hydrocarbon fraction boiling in the temperature range between 130° and 140° C.

NOTE 2.—The distillate was heterogeneous and was estimated to be about 15 vol. percent isopropanolamine layer and about 85 vol. percent hydrocarbon layer.

EXAMPLE 2

This example shows a continuous method for separating an alkanolamine from a piperazine compound by azeotropic distillation.

A mixture comprising trans-2,5-dimethylpiperazine and about 20 percent by weight isopropanolamine is fed continuously to a mid-point in an efficient fractional distillation column operating at atmospheric pressure. The column also contains a paraffinic hydrocarbon codistillation agent which is a petroleum fraction having a normal boiling range from 130° to 140° C. The column is heated by a bottom reboiler. The vapors fractionated out at the top of the column consist of the codistillation agent and isopropanolamine and are substantially free of dimethylpiperazine. The top vapors are condensed and separate into two layers, one consisting principally of isopropanolamine and the other consisting principally of the codistillation agent. The latter, i.e. the codistillation agent, is continuously returned to the column as reflux while the isopropanolamine layer is withdrawn. At a point in the lower portion of the column, the temperature is continuously observed and held to about 145° C. When the temperature at the control point rises above the set value, it is indicative that too little codistillation agent is present in the column, and corrective steps, such as increasing the reflux of codistillation agent, are taken. When the temperature at the control point falls below the set value, it is indicative that too much codistillation agent remains in the residue, and corrective steps, such as increasing the heat on the reboiler, are taken. Thereby, the column residue is substantially freed of both isopropanolamine and codistillation agent and is continuously withdrawn.

EXAMPLE 3

This example shows a continuous method for separating distillation thereby recovering isopropanolamine suitable for further use.

The ethylbenzene layer from the extractor is continuously returned to the fractional distillation column as reflux. At a point in the lower portion of the column, the temperature is continuously observed and held to about 145° C. The reboiler temperature is held at about 165° C. The residue product, comprising trans-2,5-dimethylpiperazine, is substantially free of both isopropanolamine and ethylbenzene and is continuously withdrawn.

EXAMPLE 4

This example demonstrates the use of a codistillation agent, ethylbenzene, for the separation of isopropanolamine from 2,5-dimethylpyrazine.

In a mixture of isopropanolamine and 2,5-dimethylpyrazine, the latter is the more volatile but the mixture is difficult to separate by fractional distillation, as is shown by the following test.

A 65-gram portion of a mixture consisting of 57.1 percent by weight isopropanolamine and 42.9 percent 2,5-dimethylpyrazine was charged to a still having a ¾ by 12-inch distillation column packed with glass helices. The column had a fractionating efficiency of about four theoretical plates. A distillate fraction of 9.5 grams was taken at distillation temperatures between 148° and 152° C. and contained 57.6 percent by weight 2,5-dimethylpyrazine.

In contrast, a 40-gram portion of that same starting mixture, together with 70 grams of ethylbenzene, was distilled in the same still under the same conditions. Two successive distillate fractions, totaling 33 grams and taken at distillation temperatures between 130° and 131° C., contained an average of 80.6 percent by weight ethylbenzene, 19.3 percent isopropanolamine and only a trace of 2,5-dimethylpyrazine. Isopropanolamine is more volatile than 2,5-dimethylpyrazine in the presence of ethylbenzene and is carried into the distillate while the 2,5-dimethylpyrazine remains behind in the residue.

EXAMPLE 5

This example illustrates the separation of mixtures of 2,5-dimethylpyrazine and relatively small proportions of isopropanolamine by codistillation with ethylbenzene.

To a mixture of 49 grams 2,5-dimethylpyrazine and 20 grams isopropanolamine was added 90 grams ethylbenzene and the resulting mixture was distilled in the still described in Example 4. The distillation was continued to a distillation temperature of 142° C. Substantially all of the isopropanolamine was obtained in the distillate and the residue was 95 percent 2,5-dimethylpyrazine.

EXAMPLE 6

Vapor-liquid equilibrium data were obtained for a mixture of isopropanolamine and cis-2,5-dimethylpiperazine alone and in the presence of various codistillation agents. In Table II the codistillation agents are identified and the compositions of the vapor and of the liquid at equilibrium at atmospheric pressure are shown for each test. The compositions are shown in terms of the weight percent concentration of isopropanolamine on an agent-free basis, i.e., the proportion of isopropanolamine based on the combined weights of isopropanolamine and cis-2,5-dimethylpiperazine.

Table II

| Codistillation Agent | Weight Percent Isopropanolamine on Agent-Free Basis | |
|---|---|---|
| | In Vapor | In Liquid |
| None | 36.4 | 34.0 |
| Xylene | 56.3 | 35.6 |
| Cyclohexanol | 47.4 | 34.7 |
| Anisole | 50.0 | 35.5 |

We claim:
1. A method of separating a lower alkanolamine from a mixture thereof with a pyrazine selected from the class consisting of pyrazine and lower alkyl pyrazines which comprises adding to the mixture a volatile liquid having a normal boiling point not higher than 200° C. selected from the class consisting of saturated aliphatic hydrocarbons having at least eight carbon atoms, lower alkylbenzenes, and chlorobenzene, heating the mixture and distilling therefrom an azeotrope consisting predominantly of the lower alkanolamine and said volatile liquid.

2. A method of separating isopropanolamine from a mixture thereof with 2,5-dimethylpyrazine which comprises adding to the mixture a volatile liquid having a normal boiling point not higher than 200° C. selected from the class consisting of saturated aliphatic hydrocarbons having at least eight carbon atoms, lower alkylbenzenes, and chlorobenzene, heating the mixture and distilling therefrom an azeotrope consisting predominantly of isopropanolamine and said volatile liquid.

3. A method of separating isopropanolamine from a mixture thereof with 2,5-dimethylpyrazine which comprises adding to the mixture a volatile liquid saturated aliphatic hydrocarbon having at least eight carbon atoms and a normal boiling point not higher than 200° C., heating the mixture and distilling therefrom an azeotrope consisting predominantly of isopropanolamine and said volatile liquid aliphatic hydrocarbon.

4. A method of separating isopropanolamine from a mixture thereof with 2,5-dimethylpiperazine which comprises adding to the mixture a volatile liquid saturated aliphatic hydrocarbon having at least eight carbon atoms and a normal boiling point not higher than 200° C., heating the mixture and distilling therefrom and azeotrope consisting predominantly of isopropanolamine and said volatile liquid aliphatic hydrocarbon.

References Cited in the file of this patent
UNITED STATES PATENTS
2,940,933  Patton _____ Dec. 2, 1953
2,980,680  Fowler _____ Nov. 26, 1956

OTHER REFERENCES
Advances in Chemistry Series, Azeotropic Data, pages 69–71 (1952).